(12) United States Patent
Hazanchuk

(10) Patent No.: US 6,888,372 B1
(45) Date of Patent: May 3, 2005

(54) PROGRAMMABLE LOGIC DEVICE WITH SOFT MULTIPLIER

(75) Inventor: Asher Hazanchuk, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/326,652

(22) Filed: Dec. 20, 2002

(51) Int. Cl.$^7$ .......................................... H03K 19/177
(52) U.S. Cl. ............................ 326/39; 326/40; 326/41; 326/38
(58) Field of Search ................. 326/38–41; 365/189.01, 365/189.02, 230.01, 230.02, 230.06, 230.08

(56) References Cited

U.S. PATENT DOCUMENTS

| | | |
|---|---|---|
| 5,550,782 A | 8/1996 | Cliff et al. |
| 6,118,720 A * | 9/2000 | Heile ................... 365/230.01 |
| 6,249,143 B1 | 6/2001 | Zaveri et al. |
| 6,255,849 B1 * | 7/2001 | Mohan ........................ 326/41 |

OTHER PUBLICATIONS

Altera Technical Brief 5, "Implementing Multipliers in FLEX 10K EABs" Mar. 1996, 2 pages.
Altera, "Implementing FIR Filters in FLEX Devices" Feb. 1998, ver. 1.01, pp 1–24.
Altera, "Implementing Logic with the Embedded Array in FLEX 10K Devices" May 2001, ver. 2.1, pp 1–20.

* cited by examiner

*Primary Examiner*—Vibol Tan
(74) *Attorney, Agent, or Firm*—Morrison & Foerster LLP

(57) ABSTRACT

A programmable logic device is provided which includes a multi-port RAM block with a first port including first address registers and first data registers and with a second port including second address registers and a second data registers. At least one look-up table is stored in the RAM block. First programmable logic circuitry is programmed to operate as a shift register with multiple tap outputs to multiple first address registers. Second programmable logic circuitry is programmed to operate as accumulate circuitry which includes a multi-bit input coupled to multiple first data registers and includes an accumulator output.

27 Claims, 7 Drawing Sheets

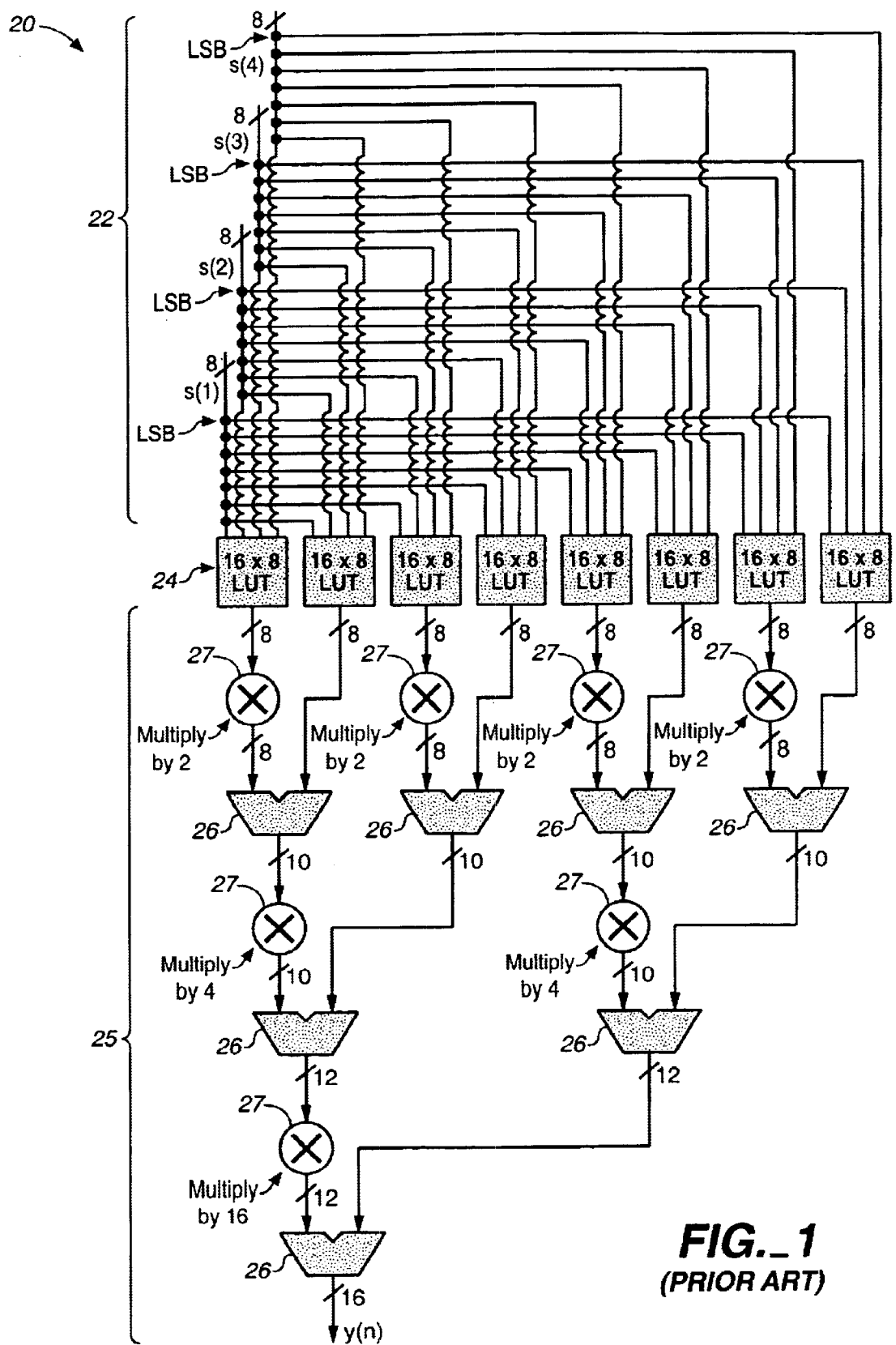
FIG._1
*(PRIOR ART)*

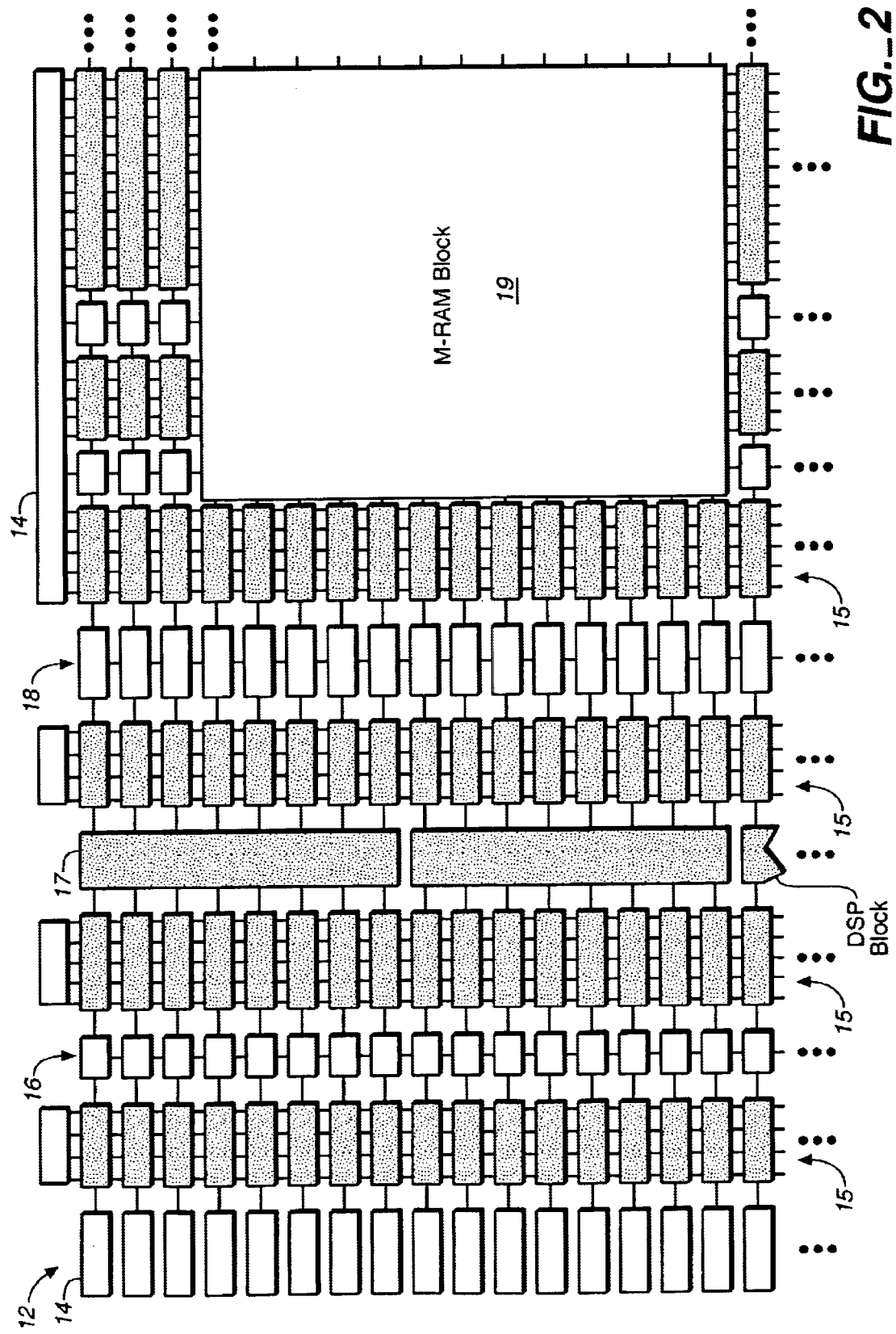
FIG._2

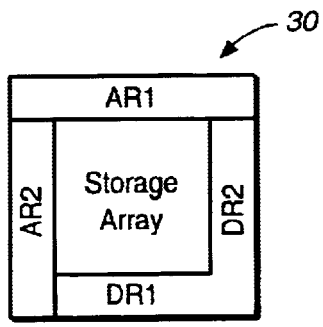
FIG._3
| RAM Block Contents ||
|---|---|
| Address | Storage Contents |
| 0000 | 0 |
| 0001 | C0 |
| 0010 | C1 |
| 0011 | C0+C1 |
| 0100 | C2 |
| 0101 | C2+C0 |
| 0110 | C2+C1 |
| 0111 | C2+C1+C0 |
| 1000 | C3 |
| 1001 | C3+C0 |
| 1010 | C3+C1 |
| 1011 | C3+C1+C0 |
| 1100 | C3+C2 |
| 1101 | C3+C2+C0 |
| 1110 | C3+C2+C1 |
| 1111 | C3+C2+C1+C0 |
FIG._5
TABLE I
| RAM Block Contents ||
|---|---|
| Address | Storage Contents |
| 0000 | 0 |
| 0001 | D0 |
| 0010 | D1 |
| 0011 | D0+D1 |
| 0100 | D2 |
| 0101 | D2+D0 |
| 0110 | D2+D1 |
| 0111 | D2+D1+D0 |
| 1000 | D3 |
| 1001 | D3+D0 |
| 1010 | D3+D1 |
| 1011 | D3+D1+D0 |
| 1100 | D3+D2 |
| 1101 | D3+D2+D0 |
| 1110 | D3+D2+D1 |
| 1111 | D3+D2+D1+D0 |
TABLE II
| RAM Block Contents ||
|---|---|
| Address | Storage Contents |
| 0000 | 0 |
| 0001 | F0 |
| 0010 | F1 |
| 0011 | F0+F1 |
| 0100 | F2 |
| 0101 | F2+F0 |
| 0110 | F2+F1 |
| 0111 | F2+F1+F0 |
| 1000 | F3 |
| 1001 | F3+F0 |
| 1010 | F3+F1 |
| 1011 | F3+F1+F0 |
| 1100 | F3+F2 |
| 1101 | F3+F2+F0 |
| 1110 | F3+F2+F1 |
| 1111 | F3+F2+F1+F0 |
FIG._6

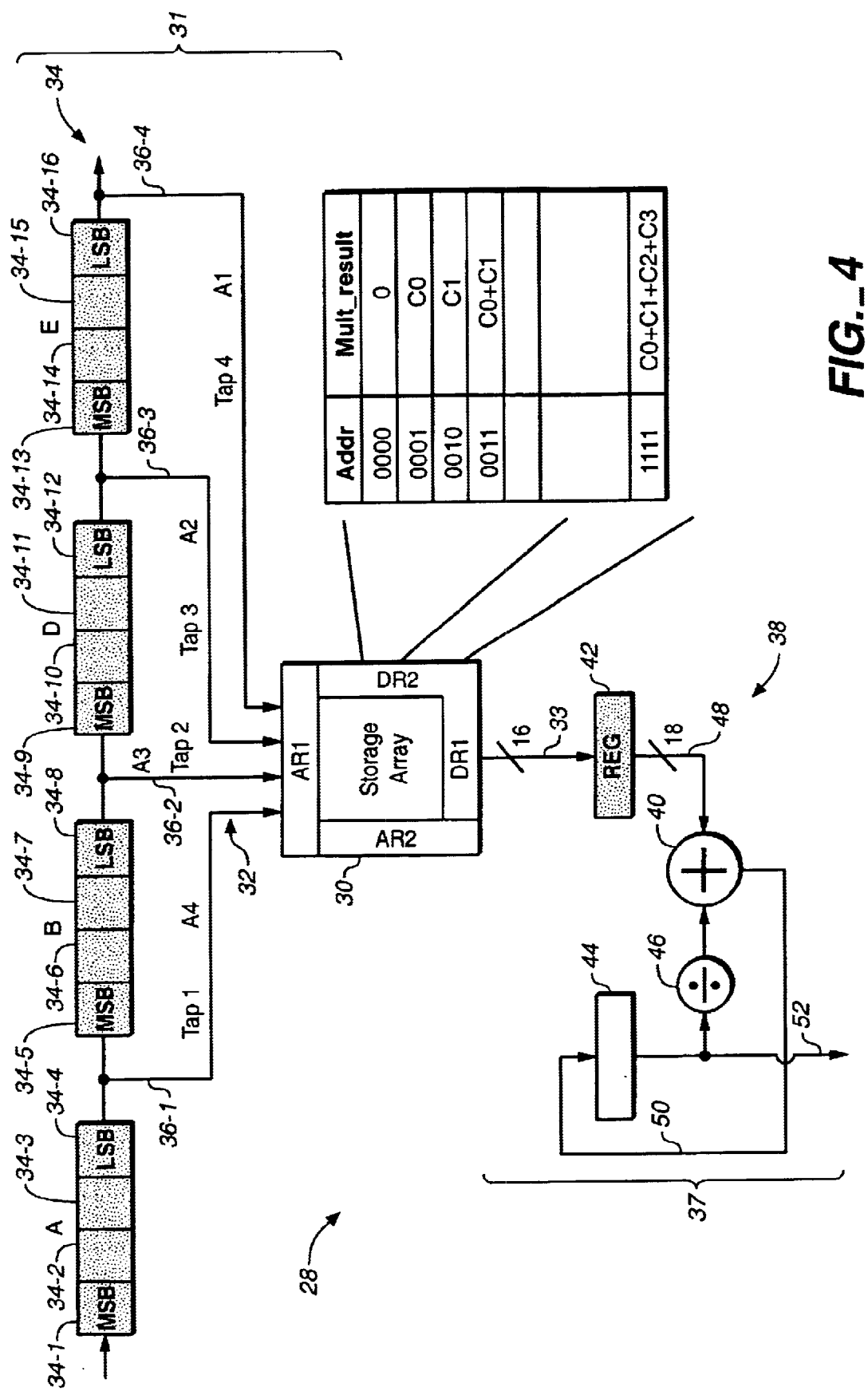
FIG._4

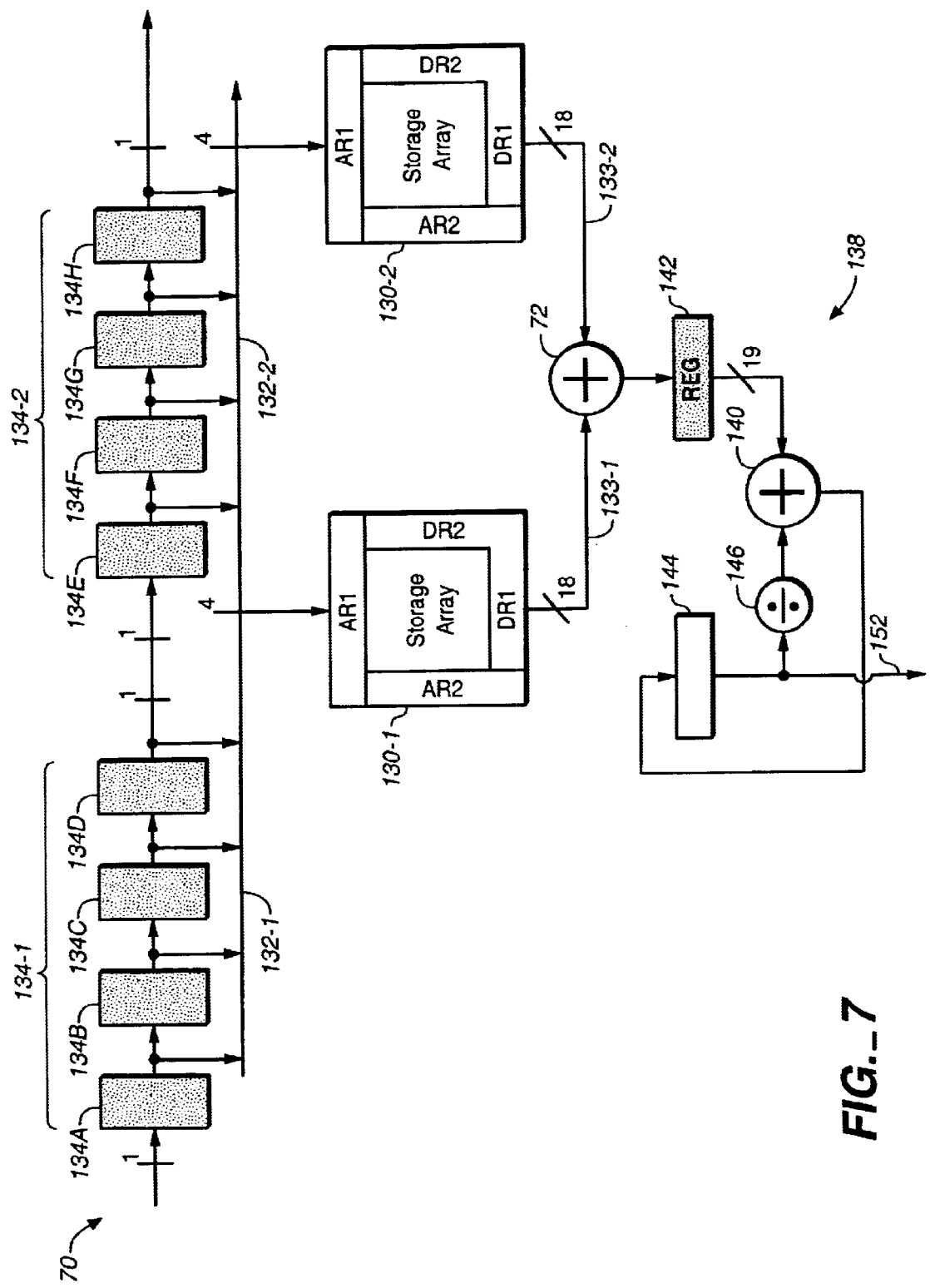
FIG._7

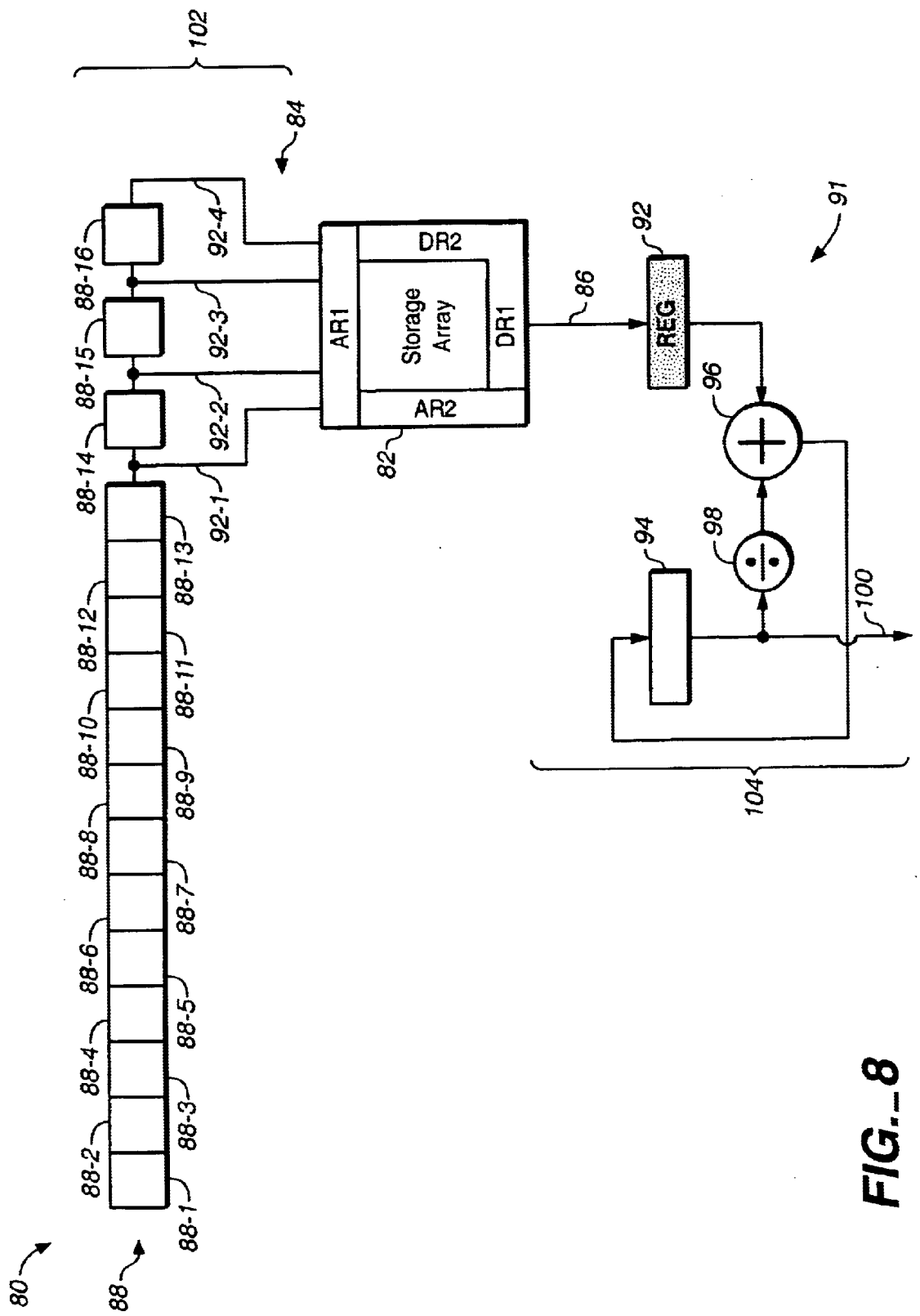
FIG._8

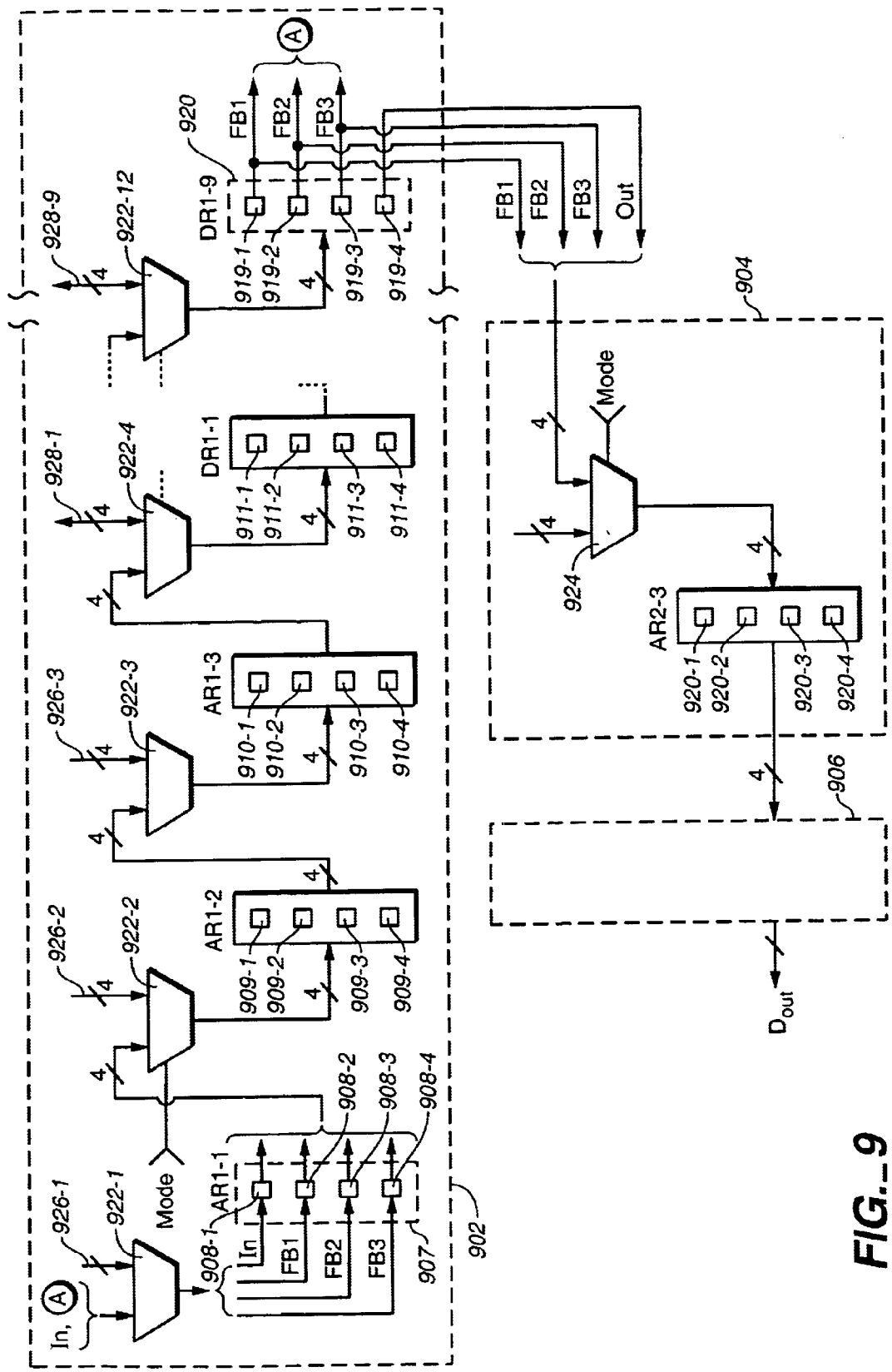
FIG._9

PROGRAMMABLE LOGIC DEVICE WITH SOFT MULTIPLIER

BACKGROUND OF THE INVENTION

1. Field of the Invention

This invention relates to programmable logic devices (PLDs), and more particularly to implementing multipliers in PLD RAM blocks.

2. Description of the Related Art

A PLD is a digital, user-configurable integrated circuit used to implement a custom logic function. For the purposes of this description, the term PLD encompasses any digital logic circuit configured by an end-user, and includes a programmable array logic array ("PLA"), a field programmable gate array ("FPGA"), and an erasable complex PLD. The basic building block of a PLD is a logic element ("LE"). A LE is capable of performing limited logic functions on a number of input variables. Conventional PLDs combine together multiple LEs through an array of programmable interconnects to facilitate implementation of both simple and complex logic functions.

U.S. Pat. Nos. 5,550,782 and 6,249,143 and commonly assigned U.S. patent application, Ser. No. 10/140,311, filed May 6, 2002, entitled, Multiple Size Memories in a Programmable Logic Device, which are expressly incorporated herein by this reference, disclose the distribution of both relatively large random access memory (RAM) blocks and numerous smaller RAM blocks throughout a single programmable logic device. For example, U.S. Pat. No. 6,249,143 discloses smaller RAM blocks associated with groupings of LEs called logic array blocks (LABs). Each LAB includes an identical collection of multiple LEs, programmable interconnect wires and a RAM block dedicated to the LAB. Each LAB includes a two dimensional array of programmable interconnect wires that can be programmed to interconnect the LEs and RAM block of a given LAB. That patent also shows a two dimensional array of programmable global interconnect wires that can be programmed to interconnect the LEs and RAM blocks of different LABs and that also can be programmed to interconnect the larger RAM blocks with different LABs.

Digital signal processing encompasses arithmetic-intensive techniques used in applications such as voice-over-IP (Internet Protocol), wireless base station with multi-channel links, adaptive elements (i.e. equalizers) and echo cancellation, to name just a few illustrative examples. Many systems use digital signal processing techniques to achieve signal filtering to remove unwanted noise, to provide spectral shaping, or to perform signal detection or analysis, for example. Two types of filters that provide these functions are finite impulse response (FIR) filters and infinite impulse response (IIR) filters. The FIR filters generally are used in systems that require linear phase and have an inherently stable structure. The IIR filters are generally used in systems that can tolerate phase distortion. Typical filter applications include signal preconditioning, band selection and low-pass filtering. For instance, the finite impulse response (FIR) filter is used in many digital signal processing systems to perform signal pre-conditioning, anti-aliasing, band selection, decimation/interpolation, low-pass filtering, and video convolution functions.

Multipliers are one of the building blocks of any DSP application. In the past, PLDs have implemented multipliers using look-up tables. For instance, FIG. 1 is an illustrative schematic drawing showing one example of an interconnection of numerous PLD logic elements to implement a vector multiplier 20 used in a 7-bit input FIR filter. An eighth bit comes from adding two 7-bit taps. The vector multiplier 20 includes a shift register 22, multiple look-up tables (LUTs) 24. It also includes multiply and accumulate (MAC) circuitry that comprises an adder tree 25 including individual adders 26 and scaling multipliers 27.

One problem with the example multiplier implementation shown in FIG. 1 is that it consumes significant PLD resources in that numerous LUTs 24 are used to implement a multiplier. Some DSP applications require numerous multipliers. Unfortunately, the resources used by each individual multiplier can reduce the number of multipliers that can be implemented in any given PLD chip. Thus, there has been a need for improvements in the implementation of multiplier functionality in PLDs.

Another problem with prior multipliers implemented in a PLD is that they sometimes have been inconvenient to re-program, especially on-the-fly. For instance, in some adaptive filter applications, there is a need to adapt (or modify), filter coefficients while a filter is operational. Thus, there has been a need an improved PLD-based multiplier that can be re-programmed more easily on-the-fly, for adaptive filter applications, for example.

The present invention meets these needs.

SUMMARY OF THE INVENTION

In one aspect of the invention, a programmable logic device is provided which includes a multi-port RAM block with a first port including first address registers and first data registers and with a second port including second address registers and a second data registers. At least one look-up table is stored in the RAM block. First programmable logic circuitry is programmed to operate as a shift register with multiple tap outputs coupled to multiple first address registers. Second programmable logic circuitry is programmed to operate as accumulate circuitry which includes a multi-bit input coupled to multiple first data registers and includes an accumulator output.

Another aspect of the invention involves the simultaneous transfer of data through the first and second ports in order to update table contents while concurrently using table contents in a multiply and accumulate operation responsive to data flow through the tapped shift register.

In one illustrative embodiment of the programmable logic device, address control circuitry regulates access to the at least one look up tables by providing read access to one storage location of the look up table via the first address registers and the first data registers of the first port while concurrently providing write access to another storage location of the look up table via the second address registers and the second data registers of the second port.

In another illustrative embodiment of the programmable logic device, first and second look up tables are stored in the RAM block. Address control circuitry regulates access to the first and second look up tables. During one time interval, the address control circuitry provides read access is provided to the first table via the first address registers and the first data registers of the first port while concurrently providing write access to the second table via the second address registers and the second data registers of the second port. During another time interval the address control circuitry provides read access to the second table via the first address registers and the first data registers of the first port while concurrently providing write access to the first table via the second address registers and the second data registers of the second port.

In another aspect of the invention, a programmable logic device includes a multi-port RAM block with a first port including first address registers and first data registers and with a second port including second address registers and second data registers. Multiple registers of the first port are coupled to operate as a shift register which includes multiple tap outputs. The multiple tap outputs are coupled to second multiple address registers of the second port. Second programmable logic circuitry is programmed to operate as accumulate circuitry which includes a multi-bit input coupled to the second data registers and includes an accumulator output.

BRIEF DESCRIPTION OF THE DRAWINGS

FIG. 1 is an illustrative schematic diagram showing one example of an earlier interconnection of numerous PLD look-up tables to implement a multiplier.

FIG. 2 is an illustrative diagram of a portion of a floor plan of a PLD 12 in accordance with one embodiment of the invention.

FIG. 3 is a simplified illustrative drawing of a dual port RAM block.

FIG. 4 is an illustrative drawing of a multiplier implemented in a PLD using the dual port RAM block of FIG. 3 in accordance with one embodiment of the invention.

FIG. 5 is an illustrative drawing of a look up table stored in the RAM block of the of FIG. 3 in accordance with one embodiment of the invention.

FIG. 6 is an illustrative drawing of first (Table I) and second (Table II) look up tables stored in the RAM block of FIG. 3 in accordance with another embodiment of the invention.

FIG. 7 is an illustrative drawing of a multiplier implemented in a PLD in which an evaluation result is derived through access to multiple multi-port RAM blocks of the type illustrated in FIG. 3 in accordance with another embodiment of the invention.

FIG. 8 is an illustrative drawing of a multiplier implemented in a PLD including a multi-port RAM block like that of FIG. 3 in accordance with another embodiment of the invention.

FIG. 9 is an illustrative circuit diagram showing one example of an embodiment of a multi-port RAM block like that of FIG. 3 in which registers of a first port are coupled as a tapped delay line that provides tap outputs that serve as address inputs to address registers of a second port.

DETAILED DESCRIPTION OF THE PREFERRED EMBODIMENTS

In one aspect, the present invention provides improvements in the implementation of arithmetic operations, particularly multiplication operations in PLDs having RAM blocks. In a different aspect, the present invention provides improvements in re-programming multipliers in PLDs having RAM blocks. The following description is presented to enable any person skilled in the art to make and use the invention. The embodiments of the invention are described in the context of particular applications and their requirements. These descriptions of specific applications are provided only as examples. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

FIG. 2 is an illustrative diagram of a portion of a floor plan of a PLD 12 in accordance with one embodiment of the invention. The portion in FIG. 2 is illustrative of a pattern that repeats throughout the chip. The PLD 12 includes an array of input/output elements (IOEs) 14, logic array blocks (LABs) 15, 32×18 bit RAM blocks 16, dedicated DSP blocks 17, 128×36 bit RAM blocks 18 and a 4K×144 bit RAM block 19. These components are interconnected by a programmable network of local and global interconnect circuitry.

One embodiment of the invention provides a programmable logic device in which programmable logic is programmed to use at least one RAM block to implement a 'soft multiplier.' As used herein, the term 'soft multiplier' indicates that it is possible to change the configuration or functionality of the multiplier by downloading new content into the RAM block. For example, by changing the content of a RAM block, its functionality might change from that of a 16×16 multiplier to that of a 20×16 multiplier. Alternatively, for example, by changing the content of the RAM block, its functionality might change from that of a sum of 6 multiplication mode to a sum of 4 multiplication mode.

The RAM block is encoded to operate as a look-up table multiplier that stores individual pre-computed values at individual storage locations. The individual values represent results of computations involving address values used to address the storage locations storing such individual values and at least one other value. First programmable logic circuitry is programmed to operate as a shift register that include multiple tap outputs coupled to the address inputs of the RAM block. Second programmable logic circuitry is programmed to operate as an accumulator that includes a multi-bit input coupled to the multi-bit output of the RAM block. In operation, bits are shifted through the shift register. A resulting sequence of multi-bit signals provided on the shift register tap outputs serve as RAM block address signals. The sequence of tap output address bits are used to retrieve a sequence of pre-computed values from the RAM block. The sequence of values retrieved from the RAM block output are summed together by the accumulator so as to produce an accumulation result.

In one aspect of the invention, PLD resources are conserved by utilizing RAM block registers to implement the shift register functionality. One example of an advantage of this first aspect is that fewer LE resources are utilized to implement multiplier functionality. In another different aspect of the invention, a soft multiplier is reprogrammed on the fly. Basically, a multi-port RAM block is used to implement the soft multiplier. While one port actively retrieves previously stored data from a look-up table for use in a data processing function, for example, another port can simultaneously write new data to a look-up table to supplant the previously stored data. The new data can be used later to support the data processing functionality. One example of an advantage of this second aspect is that adaptive filtering can be more easily achieved since a set of current coefficients can be accessed through one RAM block port while an updated set of coefficients is input through another RAM block port. Coefficients can be updated without interrupting the filtering process.

FIG. 3 is a simplified illustrative drawing of a dual port RAM block 30. The RAM block 30 includes an array of multi-bit storage locations labeled 'Storage Array'. The RAM block 30 includes a first port with first address registers AR1 and a first data registers DR1. The RAM block 30 also includes a second port with a second address registers AR2 and second data registers DR2. The drawings of FIG. 3 show the address and data registers of a given port disposed on opposite sides of the RAM block. Although in actual practice, address and data registers of a given port generally are disposed on the same edge of a RAM block. The first and second ports are operable independently of each other in that they can simultaneously access individual storage locations of the storage array. During storage array access via the first port, an individual storage location is addressed by address signals provided to the first address registers AR1. If data is to be written to the addressed storage location, then data to be written is input to the storage location via the first data registers DR1. If data is to be read from the addressed storage location, then data retrieved from the addressed storage location is output via the first data registers DR1. The second port operates in an analogous manner. Individual storage locations of the storage array can be addressed via address signals provided to the second address registers AR2. Data to be written to or read from an addressed storage location via the second port are transferred through the second data registers DR2. Details of control signals used to control the read/write operations of the first and second ports are not described herein since these details will be readily understood by persons of ordinary skill in the art. It will be appreciated that, although the RAM block 30 of FIG. 3 is shown to include only a first and second ports, embodiments of the invention can be implemented using multi-port RAM blocks having more than two ports.

FIG. 4 is an illustrative drawing of a 4-tap filter 28 implemented using the multi-port RAM block 30 in accordance with an embodiment of the invention. First address registers AR1 of the RAM block 30 are coupled to a multi-bit address input 32 that provides signals to address individual storage locations: The first data registers DR1 of the RAM block 30 are coupled to provide a multi-bit data output 33 for conducting, signals representing data stored at storage locations addressed by address signals provided on the address input 32. First programmable logic circuitry 31 is programmed to operate as a shift register 34 that includes individual registers 34-1 to 34-16 interconnected as shown. The shift register 34 includes multiple tap outputs 36-1, 36-2, 36-3 and 36-4 coupled as shown to the multi-bit address input 32 of the RAM block 30. Second programmable logic circuitry 37 is programmed to serve as multiply and accumulate (MAC) circuitry 38. The MAC circuitry 38 operates as an accumulator that includes adder circuitry 40, a multi-bit input register 42 coupled to the multi-bit output 33 of the RAM block 30 and accumulator register 44 for storing accumulation results output by the adder 40. The MAC circuitry 38 also includes divider circuitry 46 used to scale the value stored in the accumulator register 44. Although the term 'multiply' is used to denote circuitry 38, it will be appreciated that the role of the multiply function is to scale the contents of accumulator register 44 relative to the contents of input register 42 prior to adding the values currently stored in the two registers. Persons skilled in the art will appreciate that this scaling can be achieved through a multiplication or a division operation. In fact, in the illustrated embodiment, the scaling operation is achieved using a divider circuit 46. Thus, the term 'MAC circuitry' encompasses implementations using scaling through multiplication or through division.

The divider 46 scales by dividing the accumulator contents by two. A multi-bit output 48 of the input register 42 is coupled to a first addend input of the adder 40. A multi-bit output of the divider circuitry is 46 coupled to a second addend input of the adder 40. A multi-bit sum output 50 of the adder 40 is coupled to provide an input to the accumulator register 44. A multi-bit output 52 of the accumulator register 44 is coupled to an input of the scaling divider 46 and also provides a multi-bit accumulator output 52.

A role of the scaling circuitry, divider 46 in the illustrated example, is to weight stored values retrieved from the RAM block 30 relative to one another. Stored values are retrieved from the RAM block seriatim, one at a time, and the scaling circuitry serves to weight each value relative to other stored values previously retrieved or later retrieved from the RAM block 30. The divider circuitry 46 serves to scale the contents of the accumulator 44 relative to the contents of the register 42 so as to weight these contents differently. Dividing the contents of the accumulator register 44 by two has the effect of decreasing the magnitude of the accumulator contents relative to the contents of register 42 by a factor of two. Considered from another point of view, such dividing has the effect of increasing the magnitude of the contents of register 42 by a factor of two relative to the contents of the accumulator register 44. Alternatively, an equivalent scaling result can be achieved by using multiplier circuitry (not shown) to the multiply the contents of the input register 42 by two. Thus, the scaling circuitry scales the relative magnitudes of the input register 42 and the accumulator register 46.

In the illustrated embodiment, each of the registers 34-1 to 34-16 stores and shifts one bit of data at a time. A total of sixteen bits of data can be stored in the shift register 34 at any given moment. The shift register 34 is implemented to serially shift (one bit at a time) data, from left to right in the drawing, from register 34-1 to 34-16. For example, fifteen shifts are required to shift one bit of data located in first register 34-1 to the sixteenth register 34-16; upon occurrence of a sixteenth shift, that data bit is shifted out of the sixteenth register 34-16. It will be appreciated that new data bits can be added to the first register 34-1 as bits are shifted through the register 34 so as to keep the register 34 filled with data bits at all relevant times. Also, it will be understood that shift register 34 may be a segment of a larger register, and that the first register 34-1 receives data bits from another upstream register (not shown) while the sixteenth register 34-16 shifts data bits to another downstream register (not shown).

The tap outputs 36-1 to 36-4 are spaced apart from each other by a prescribed number of intervening registers apiece. In a present embodiment, the prescribed number is four. For example, the first tap output 36-1 is spaced apart from the second tap output 36-2 by four registers, specifically, the fifth through eighth registers 34-5 to 34-8. This spacing of tap outputs is selected during the programming of the first programmable logic circuitry 31 so as to implement a desired sampling strategy. The filter embodiment of FIG. 4 evaluates one 4-bit sample at a time. The four output taps 36-1 to 36-4 provide access to respective bits of different respective 4-bit data samples within the shift register. More specifically, multiple 4-bit data samples are loaded within the shift register at any given time. Data bits are shifted into the shift register separately, one bit at a time. A first 4-bit sample is shifted in first followed in order by the second, third and fourth 4-bit samples. As a result, a fourth four-bit sample is provided in the first through fourth registers 34-1 to 34-4. A third four-bit sample is provided in the fifth through eighth registers 34-5 to 34-8. A second four-bit sample is provided in the ninth through twelfth registers 34-9 to 34-12. A first four-bit sample is provided in the thirteenth through sixteenth registers 34-13 to 34-16.

The 4-bit samples are shifted into the shift register 34 one sample at a time with a least significant bit (LSB) being loaded first and a most significant bit (MSB) being loaded last for each sample. Thus, when all four samples have been loaded into the sixteen registers 34-1 to 34-16, register 34-4 holds the LSB of a fourth sample; register 34-8 holds a LSB of a third sample; register 34-12 holds a LSB of a second sample; and register 34-16 holds a LSB of a first sample. Therefore, the fourth output tap 36-4 provides access to the LSB of the first sample; third output tap 36-3 provides access to the LSB of the second sample; second output tap 36-2 provides access to the LSB of the third sample; and first output tap 36-1 provides access to the LSB of the fourth sample.

FIG. 5 illustrates the contents of one look-up table stored in the RAM block 30. In the illustrated embodiment, the multi-bit address input 32 of RAM block 30 includes four address pins A4–A1 used to address sixteen storage locations 0000 to 1111. Each respective storage location stores a respective value. In the filter embodiment of the invention, each value represents a mathematical result determined based upon a mathematical operation involving the bit values of the address of the storage location containing that value and at least one other value. In a current embodiment the mathematical determination involves multiplication and is represented by the following relationship.

$$\text{Stored Value} = A4(C3) + A3(C2) + A2(C1) + A1(C0)$$

Thus, in that embodiment each storage location stores a result representing a sum of a multiplication of address bit A4 on tap the first output 36-1 multiplied by C3, plus a multiplication of address bit A3 on tap second output 36-29 by C2, plus a multiplication of address bit A2 on tap third output 36-3 by C1, plus a multiplication of address bit A1 on tap fourth output 36-4 by C0. Thus, coefficients C0–C3 represent factor values multiplied by address bit values to determine the contents of the storage locations of the RAM block 30. For example, as shown in FIG. 5, storage location 0000 stores value 0. Storage location 0001 stores value C0. Storage location 0010 stores C1. Storage location 1001 stores C3+C0. Storage location 1101 stores C3+C2+C0. Storage location 1111 stores C3+C2+C1+C0.

For example, the fourth tap output 36-4 is coupled to the most significant address bit A4 of the address input 32. In the illustrated embodiment the stored pre-computed mathematical value includes a term, A4(C3), that represents the multiplication of C3 by the first sample LSB value applied by the fourth tap output 36-4 to the most significant address bit A4. Hence, for each storage location for which the most significant address bit is 0, C3 is multiplied by 0. For each storage location for which the most significant address bit is 1, C3 is multiplied by 1. In other words, since the fourth output tap 36-4 determines the value applied to the most significant address bit A4, it also determines the C3 component of the value retrieved from the RAM block 30 at each storage location. If the fourth output tap and the A4 value is 0, then the C3 contribution to the stored value at the addressed location is 0. If the fourth output tap and the A4 value is 1, then the C3 contribution to the stored value at the addressed location is C3.

In essence, the RAM block 30 serves as a multiplier of coefficient values by tap output values. More specifically, the RAM block 30 serves as a table that stores pre-computed values determined by mathematical combinations of possible shift register contents and other factor values. In the illustrated example, the other factor values include C0–C4. The RAM block 30 stores the pre-computed results of multiplication operations involving all possible combinations of tap output values and coefficient values according to the above equation. Since the tap output values are coupled to the address inputs 32 of the RAM block 30, the tap values determine which storage location of the RAM block is accessed for the retrieval of a stored pre-computed value.

In operation, the individual storage locations of RAM block 30 or 30' are encoded with pre-computed values derived from individual storage addresses and at least one other factor. In a present embodiment, the at least one other factor includes one of several different coefficient values. Each address bit of a storage location's address is multiplied by one of the coefficient values, and the products of such multiplication for all address bits are summed to produce a pre-computed value for that storage address. It will be appreciated that other computations can be used to derive the pre-computed values consistent with the invention. As data bits are shifted through shift register 34 or 34', tap outputs 36-1 to 36-4 are provided as address bit inputs A4 to A1 so as to address corresponding storage locations in the RAM block 30 or 30'. Since bits are shifted sequentially through the shift register 34 or 34', a sequence of addresses is provided by tap outputs 36-1 to 36-2. Each one-bit shift results in a new address combination. Stored pre-computed values are retrieved from the RAM block 30 or 30' in response to addresses presented by the output taps. The details of the control signals used to read stored data from the RAM block are not described herein since they form no part of the present invention and will be readily understood by persons of ordinary skill in the art. However, it is worth noting that there is no requirement that every address presented by the output taps 36-1 to 36-4 is used retrieve a stored value. In other words, for example, it is within the scope of the invention to retrieve every other storage location presented by the output taps. This would correspond to retrieving a pre-computed value for every other one-bit shift within the shift register 34 or 34'.

The retrieved values are presented one at a time as input to the input register 42 of the MAC circuitry 38. In a present embodiment, the retrieved values are input to the input register 42 in the sequence in which they are retrieved from the RAM block 30 or 30'. Each value input to the input register 42 is provided to adder 40 which adds the input value to a quotient resulting from a divide-by-two operation performed by divider 46 upon the contents of the accumulator register 44. The division operation scales the magnitude of the currently stored value in the accumulator register 44 relative to a magnitude of the currently stored value in the input register 42. Scaling using a division operation on the accumulator register contents has the effect of increasing the magnitude of the contents of the accumulator register 44 relative to the contents of the input register 42. As a result of this scaling operation, each value retrieved from the storage block 30 or 30' is increased by a power of two relative to the current value in the accumulator register 44. The two values as scaled are added together by adder 40 to produce a new accumulator value on line 50 that is stored in the accumulator register 44. This retrieval and accumulation cycle repeats until all bits of a prescribed sample have been processed. The cycle then repeats for a next set of samples. Thus, in the example embodiment of FIG. 3, after four cycles, an output on line 52 represents an evaluation result. Following presentation of the evaluation result, the accumulator register 44 is cleared to zero, and another four samples can be evaluated to a next evaluation result.

Moreover, the first port can be used to access one storage location of RAM block 30 while the second port is used to update another storage location of the RAM block 30. More specifically, address signals provided on input 32 by the shift register taps (A1–A4) via the first address registers AR1 address individual storage locations, and data stored at an addressed location is read out and provided to the MAC circuitry 38 via the first data registers DR1. At the same time, data at another location of the RAM block 30 can be updated via second address registers AR2 and the second data registers DR2 of the second port.

FIG. 6 shows two coefficient look up tables stored simultaneously in the multi-port RAM block 30 in accordance with one embodiment of the invention. In the course of an on-the-fly update to coefficients used in a multiplication operation, multiple coefficient look up tables can be stored in the multi-port RAM block 30. Two are shown in FIG. 6 In one embodiment, one table is operational in the multiplication process, while the other table is updated. The first port (AR1, DR1) accesses the contents of one table, while the second port (AR2, DR2) accesses the contents of the other table. The two tables can reverse roles when the second port finishes a round of updating. In other words, the first port receives address signals provided on tap lines 36-1 to 36-4 to AR1, retrieves the contents of storage locations of the one table addressed by the address signals, and provides the retrieved contents via DR1 as output to input register 42. Meanwhile, at the same time, the second port can receive address signals via AR2 and update data via DR2. The second port writes the received data to the other table. Once the other table has been updated, the roles of the two tables can be reversed. The other table becomes the operational table, receiving tap inputs 36-1 to 36-4 via the first port, while the one table is updated via the second port. This operational/updating role reversal process can continue throughout the multiplication operation so that the coefficients can be adapted continually in real time without interruption of the multiplication operation.

FIG. 6 shows an example in which a first look up table occupies storage locations 00000 through 01111 and a second table occupies storage locations 10000 through 11111. The first table, for example, includes coefficient 0 at address location 00000, coefficient D2+D1 at location 00110 and coefficient D3+D2+D1+D0 at location 01111. The second table, for example, includes coefficient 0 at address location 10000, coefficient F2+F1 at location 10110 and coefficient F3+F2+F1+F0 at location 11111. In operation, MSBs of the address signal inputs to AR1 and AR2 determine which table is accessed by which port. For instance, if the MSB of AR1 is set to 0 while the MSB of AR2 is set to 1, then the first port can access the first table while the second port can access the second table. In this first state, the first table would be operational while the second table is updated. Once the second table has been updated, the MSB of AR1 can be set to 1 and the MSB of AR2 can be set to 0 so as to reverse the roles of the two tables. In this second state, the first port can access the second table while the second port can access the first table. In this second state, the second table would be operational while the first table is updated.

Alternatively, the RAM block can retrieve data (e.g., coefficients) from one table for use in a multiplication process while simultaneously updating that same table. For example, referring to the illustrative table shown in FIG. 5, in this alternative mode of operation, the first port can be used to access storage location 0011 in order to read the value C0+C1 stored there, while the second port is used to concurrently access storage location 1101 in order to write a new value into that location to update the value C3+C2+C0 previously stored there. Address contention logic can be used to manage attempts at simultaneous accesses to the same storage location of the table by the two ports.

Address Control circuitry (not shown) regulates the transfer of data through the first and second ports. For example, in an embodiment of the RAM block that includes multiple tables, as shown in FIG. 6, that alternate between serving as the operational table accessed through the first port, and the update table accessed through the second port, the address control circuitry may include circuits that toggle the MSB address signals between 0 and 1, when the update table has been updated. More specifically, when the second table is updated, the address control circuitry provides read access to the first table via the first address registers and the first data registers of the first port, and concurrently provides write access to the second table via the second address registers and the second data registers of the second port. Conversely, when the first table is updated the address control circuitry provides read access to the second table via the first address registers and the first data registers of the first port, and concurrently provides write access to the first table via the second address registers and the second data registers of the second port. Alternatively, when a single table, such as the table shown in FIG. 5, serves both as the operational and update table, the address control logic may serve an address contention role to avoid data access collisions (simultaneous reads and writes at the same table location). More particularly, the address control circuitry in such alternative embodiment provides read access to one storage location of the look up table via the first address registers and the first data registers of the first port while concurrently providing write access to another storage location of the one look up table via the second address registers and the second data registers of the second port. The Address Control circuitry may be implemented by programming of third programmable logic (elements) or it may be implemented using dedicated logic.

FIG. 7 is an illustrative drawing of another embodiment of the invention in which an evaluation result is derived through access to multiple RAM blocks 130-1 and 130-2. In the interest of avoiding a duplicative description, items in FIG. 7 that are identical to corresponding items of FIG. 4 are labeled with a three digit numeral in which the last two digits are the same as the two digits identifying the corresponding item in FIG. 4.

The embodiment of FIG. 7 comprises a system 70 implementing distributed arithmetic based soft multiplier operations. The system includes first and second multi-port RAM blocks 130-1 and 130-2 that include respective first and second multi-bit address inputs 132-1 and 132-2 and respective first and second multi-bit RAM block outputs 133-1 and 133-2. A first shift register portion 134-1 includes sixteen individual registers that can hold four 4-bit samples in four sets of four registers 134A to 134D. A second shift register portion 134-2 includes sixteen individual registers that can hold four 4-bit samples in four sets of four registers 134E to 134H. In the illustrative drawings of FIG. 6, the first and second register portions 134-1 and 134-2 are shown to be different portions of the same register interconnected so that the output of the LSB register of register set 134D feeds directly to the MSB register of register set 134E. However, in an alternative embodiment (not shown) the first and second register portions 134-1 and 134-2 may be portions of different registers in which the first and second portions 134-1 and 134-2 are not interconnected.

The system also includes RAM block output adder circuitry 72 coupled to receive as input the first and second multi-bit RAM block outputs 133-1 and 133-2. MAC circuitry 138 includes accumulator adder circuitry 140, a multi-bit input register 142 coupled to the multi-bit output of RAM block output adder 72 and also includes an accumulator register 144 for storing accumulation results output by the RAM block adder 140. Divider circuitry 146 is used to scale the value stored in the accumulator register 144.

The first and second shift register portions 134-1 and 134-2 are implemented in first programmable logic circuitry 131. The RAM block output adder circuitry 72 is implemented in second programmable logic circuitry. The scaling accumulator is implemented in third programmable logic circuitry 137. Alternatively, the first and second shift register portions 134-1 and 134-2 can be implemented using respective write registers (not shown) of the first and second RAM blocks 130-1 and 130-2.

Operation of the first and second multi-port RAM blocks 130-1 and 130-2, of the first and second shift register portions 134-1 and 134-2 and of the MAC circuitry 138 will be understood from the above description of the embodiments illustrated in FIGS. 3–6. The role of the RAM block output adder 72 is to add the outputs from the first and second RAM blocks 130-1 and 130-2 and to provide their sum to the input register 142 of the MAC circuitry 138. The embodiment of FIG. 7, for example, may be useful in FIR filter applications in which the number of output taps exceeds the number of address bit input lines of a single RAM block. Moreover, it will be understood that the system 70 of FIG. 7 can be extended to include additional RAM blocks (not shown) that are interconnected by implementing the RAM block output adder 70 as an adder tree circuit with enough inputs to receive an output from the additional RAM blocks (not shown). Moreover one storage location of RAM block 130-1 can be updated while another storage location of RAM block 130-1 is simultaneously accessed to retrieve a coefficient for use in a multiply operation. Similarly, one storage location of that same RAM block 130-2 can be updated while another storage location of that same RAM block 130-2 is simultaneously accessed to retrieve a coefficient for use in a multiply operation.

FIG. 8 is an illustrative block diagram of a multiplier circuit 80 in accordance with another embodiment of the invention. The multiplier circuit includes a multi-port RAM block 82 of the general type described with reference to FIG. 3. RAM block 82 includes multiple multi-bit storage locations that can be encoded identically to the encoding of the storage locations of the RAM blocks 30, 130-1 and 130-2 described above with reference to FIGS. 3–7. The RAM block 82 includes a multi-bit address input 84 and a multi-bit data output 86. In the illustrated embodiment, the address input 84 includes input lines A4 to A1 as shown. A shift register 88 is provided which includes sixteen individual registers 88-1 to 88-16. Four adjacent registers 88-13 to 88-16 include tap outputs 90-1 to 90-4 respectively coupled to address lines A4 to A1 of the multi-bit address input of RAM block 82. In the illustrated embodiment, the four adjacent registers are the last four registers in the sixteen bit register 88. The multiplier circuit 80 includes a scaling accumulator that operates like that described above with reference to the embodiment of FIG. 4. More specifically, the scaling accumulator 91 includes an input register 92, an accumulator register 94, an adder 96, a divider 98 and a multi-bit accumulator output 100 interconnected as shown.

In operation, the multiplier circuit 80 uses the RAM block 82 as a look-up table to multiply an N-bit value, m-bits at a time by one or more factor values. The N-bit value includes n groups of m of bits each. The multiplication occurs in n stages. During each stage, a look-up table multiplication operation is performed on an m-bit group. Each look-up table multiplication operation multiplies a value represented by one m-bit group by at least one factor value. More specifically, each m-bit group is provided seriatum (one group at a time) as the tap outputs of m registers of the shift register 88. The RAM block 82 stores a plurality of pre-computed product values. Each product value is a pre-computed result of a multiplication of a possible m-bit value and at least one other factor value. Each such pre-computed product value is stored at a respective address location that corresponds to an m-bit value that was multiplied by the at least one factor value to arrive at that respective pre-computed value. Thus, each possible m-bit value corresponds to a pre-computed value stored in a storage location of the RAM block 82 addressed by that m-bit value. The scaling accumulator 91 is used to combine the results of n look-up table multiplication stages in which the n m-bit groups are multiplied one at a time by at least one other factor.

Furthermore, in operation, the contents of the RAM block 82 can be changed on the fly, in the course of an ongoing multiply operation. That is, similar to the embodiment of FIGS. 3–6, one storage location of RAM block 82 of the embodiment of FIG. 8 can be updated with a new coefficient value while another storage location of RAM block 82 is simultaneously accessed to retrieve a currently stored coefficient value for use in a simultaneously occurring multiply operation. The use of one port to provide access for multiply operations while another port is used to update multiply coefficients makes possible a more efficient adaptive multiplier in which coefficients can be changed easily without the need to interrupt the multiplication process.

In the embodiment illustrated in FIG. 8, N=16; n=4; and m=4. In particular, a sixteen bit value is provided in the shift register 88 by at least one factor value so as to produce product information stored in the RAM block 82. The overall multiplication operation involves four (n=4) separate look-up table multiplication operations performed on four separate groups of four bits of data apiece (m=4). Each separate multiplication operation involves retrieval of pre-computed product data stored at a storage location address of the RAM block 82 indicated by the register values of registers 88-13 to 88-16 which are provided on tap outputs 92-1 to 92-4. The result of each four bit multiplication operation is combined with the result of previous multiplication operations using the scaling accumulator circuitry 91. After four multiplication operations, an overall product is provided on the accumulator output 100.

More particularly, the multiplication in four stages. Initially, sixteen bits of data are loaded in the shift register 88. The bits are bits 1 to 16. Initially, bit-1 is in register 88-1; bit-2 is in register 88-2; bit-3 is in register 88-3; etc. Initially, the contents of the accumulator register 94 are reset to 0 zero. During a first stage, the bit-13 to bit-16 values in registers 88-13 to 88-16 are used to address a storage location of the RAM block 82. A first value retrieved from this location is provided to the input register 92. A current value in the accumulator register 94 is scaled by divider 98. The scaled accumulator value is added to the first retrieved value, and the result is loaded into the accumulator register as a new current accumulator value. The shift register shifts contents by four bits so that bit-9 to bit-12 is loaded in registers 88-13 to 88-16. During a second stage, the bit-9 to bit-12 values in registers 88-13 to 88-16 are used to address a storage location of the RAM block 82. A second value retrieved from this location is provided to the input register 92. A current value in the accumulator register 94 is scaled by divider 98. The scaled accumulator value is added to the second retrieved value, and the result is loaded into the accumulator register as a new current accumulator value. During a third stage, the bit-5 to bit-8 values in registers 88-13 to 88-16 are used to address a third storage location of the RAM block 82. A third value retrieved from that third location is provided to the input register 92. A current value in the accumulator register 94 is scaled by divider 98. The scaled accumulator value is added to the third retrieved value, and the result is loaded into the accumulator register as a new current accumulator value. During a fourth stage, the bit-1 to bit-4 values in registers 88-13 to 88-16 are used to address a fourth storage location of the RAM block 82. A fourth value retrieved from that fourth location is provided to the input register 92. A current value in the accumulator register 94 is scaled by divider 98. The scaled accumulator value is added to the fourth retrieved value, and the result is loaded into the accumulator register as a new current accumulator value. In this example the accumulator value resulting after the fourth stage is provided as the multiplication result on the accumulator output 100. The shift register 88 with multiple tap outputs 92-1 to 92-4 interconnected with a read address input lines A4 to A1 of the RAM block 82 can be implemented using first programmable logic.

FIG. 9 is an illustrative circuit diagram showing one example of an embodiment of a RAM block in which registers of a first port are coupled as a tapped delay line that provides tap outputs that serve as address inputs to address registers of a second port. In order to simplify the drawings, the actual storage array is not shown in FIG. 9. In this embodiment, the first port includes first address and data registers AR1 and DR1 coupled as shown within dashed lines 902. The second port includes second address and data registers AR2 and DR2 represented by dashed line blocks 904, 906, respectively. In the embodiment of FIG. 9, registers of the first port are coupled to implement a tapped shift register that operates similarly, though not identically, to that described with reference to FIG. 4.

In one multi-port RAM block embodiment, the address registers (AR1 and AR2) of each port include twelve one bit registers, and the data registers (DR1 and DR2) of each port include thirty-six one bit registers. In the embodiment of FIG. 9, the first address and data registers, AR1 and DR1 within dashed lines 902 are coupled to implement a tapped shift register. The tapped shift register is coupled to provide its tap outputs as address signal inputs to the second address register AR2 within dashed lines 904. In a present embodiment, internal RAM wires are used to couple a tapped shift register comprising AR1 and DR1 to register AR2. The address signal input to the second address register AR2 is to use address storage locations of the storage array (not shown). Values $D_{out}$ stored at addressed storage locations of the storage array are retrieved from the storage array via the second data registers DR2 represented by dashed lines 906.

More specifically, in a tapped shift register mode of operation, the first address register AR1 and the first data register DR1 are concatenated or combined into a four bit wide, twelve shift long, parallel shift register with feedback. The first address register AR1 includes three four bit wide shift register segments AR1-1, AR1-2 and AR1-3. The first data register DR1 includes nine four bit wide shift segments DR1-1 to DR1-9. Only the first (DR1-1) and last (DR1-9) four bit wide first data register shift segments are shown in the drawing. Each respective four-bit wide shift segment is coupled to its adjacent shift segments through respective multiplexer circuits 922-1 to 922-12. Shift register segment AR1-1, shown with dashed lines 907, includes four individual registers 908-1 to 908-4 coupled as shown to parallel shift four bits of data at a time. Each of the other registers of the first address register segments AR1-2 and AR1-3 also include four individual registers coupled to parallel shift four bits of data. Similarly, each of the shift register segments of the first data register DR1, that is DR1-1 to DR1-9, also includes four individual registers coupled to parallel shift four bits of data at a time. For example, data register segment DR1-9, shown within dashed lines 920, includes four individual registers 919-1 to 919-4 coupled as shown to parallel shift four bits of data.

A multi-tap output of the tapped shift register implemented using portions of the first address registers (AR1) and first data registers (DR1) of the first port of the RAM block is provided as an address input to an address register (AR2) of the second port. Data is retrieved via data registers (DR2) of the second port in response to tap output bits provided to the second address registers (AR2). In the illustrated embodiment, output signals provided by ninth register segment DR1-9 of the tapped delay line serve as input to a third address register segment AR2-3 of the second port. The first and second address register segments of the second port are not shown since they are not used in the illustrated embodiment. The addressed data is retrieved via the second data registers, represented by dashed lines 906, of the second port of the RAM block.

In operation, mode select inputs to the multiplexers 922-1 to 922-12 and 924 are set to shift mode. In a present embodiment, these multiplexers are internal to the RAM block. In shift mode, the contents of each shift register segment of the tapped delay line parallel shift to its adjacent downstream (to the right) shift register segment. For instance, during one given shift increment, the content of register 908-1 is shifted via multiplexer 922-2 to register 909-1. The content of register 908-2 is shifted via multiplexer 922-2 to register 909-2. The content of register 908-3 is shifted via multiplexer 922-2 to register 909-3. The content of register 908-4 is shifted via multiplexer 922-2 to register 909-4.

During such given increment, contents of the other registers are similarly shifted via their corresponding downstream (to the right) multiplexers to corresponding adjacent downstream registers. Continuing with the above example, the content of register 909-1 shifts to register 910-1, and the content of register 910-1 shifts to register 911-1, etc. Moreover, for example, the contents of registers 909-2, 909-3 and 909-4 respectively shift to registers 910-2, 910-3 and 910-4.

The first (AR1-1) and last (DR1-9) shift register segments of the tapped delay line are coupled so that the first segment AR1-1 receives feedback input from the last segment DR1-9. A one bit (serial) input signal "In" that is provided from an external source (not shown) is input to a first register 908-1 of shift register segment AR1-1. A first one bit signal feed back signal FBI fed back from an output of a first register 919-1 of DR1-9 is input to a second register 908-2 of AR1-1. A second one bit feed back signal FB2 fed back from an output of a second register 919-2 of DR1-9 is input to a third register 908-3 of AR1-1. A third one bit feed back FB3 fed back from an output of a third register 919-3 of DR1-9 is input to a fourth register 908-4 of AR1-1. An output signal "Out" provided by a fourth register 919-4 is shifted out so as to not be fed back through the tapped shift register.

Furthermore, in operation the four bit parallel output provided by registers 919-1 to 919-4 of serves as a tap outputs that are provided, via multiplexer 922, as parallel input to the address register (AR2) of the second port. It will be appreciated that the illustrated embodiment operates as a tapped delay line with a twelve bit resolution. Specifically, the output of the first register 919-1 of data register segment DR1-9 serves as a tap output that is provided as input to a first register 920-1 of address register segment AR2-3. Output of the second register 919-2 of data register segment DR1-9 serves as a tap output that is provided as input to a second register 920-2 of address register segment AR2-3. Output of the third register 919-3 of data register segment DR1-9 serves as a tap output that is provided as input to a third register 920-3 of address register segment AR2-3. Output of the fourth register 919-4 of data register segment DR1-9 serves as a tap output that is provided as input to a fourth register 920-4 of address register segment AR2-4.

Address values provided to AR2-3 are used to address storage locations of the storage array (not shown). The contents of AR2-3 represent LSB address values of address register AR2. In the illustrated embodiment, shift register segments AR2-1 and AR2-2 (not shown) of the second port are not used and may, for example, contain all 0's. Coefficients can be retrieved from the storage array in response to address signals provided to AR2-3. The retrieved coefficients $D_{out}$ can be output via the second data registers DR2 of the second port.

Thus, in the embodiment of FIG. 9, a tapped delay line is implemented using address and data registers of a first port of a multi-port RAM block. A tapped shift register implemented with one or more address and/or data registers of the first port provides address inputs to address registers of a second port of the multi-port RAM block. It will be appreciated that a tapped shift register may be implemented using only a subset of the registers of the first port. Data is retrieved and output via the data registers of the second port in response to the address signals output by the tapped delay line. As a result, less programmable logic circuitry is consumed than in the embodiments like those of FIG. 4, 7 or 8, for example, to implement a tapped delay line functionality.

It will be understood that tapped delay lines such as those described with reference to the embodiments of FIGS. 4, 7 and 8 can be implemented using the registers of one port of a multi-port RAM block. Data registers of the other port can be coupled to programmable logic circuitry programmed to function as accumulator circuitry, for example. Of course, the number of bits of resolution of the tapped shift registers and the number and placement of tap outputs can be changed, for example, by changing the coupling among of shift register segments. For instance, referring to FIGS. 4 and 9, persons skilled in the art will appreciate that registers of a first port of a multi-port RAM block can be coupled to implement the tapped delay line of FIG. 4. Output of a tapped delay line formed from registers of the first port of a RAM block can be coupled to provide address signals to the address registers of a second port of the RAM block. Data registers of the second port can be coupled to provide input to MAC circuitry analogous to MAC circuitry 38 of FIG. 4. Specifically, for example, the second data registers DR2 of FIG. 9 can be coupled to provide input to programmable logic circuitry programmed to operate as an adder similar to that shown in FIG. 4.

As an alternative mode of operation, the RAM block can be put into a normal mode of operation in which the first and second ports operate independently of each other (subject to address contention control). A mode control input to the multiplexers 922-1 to 922-12 and 924 controls the mode of operation. In normal mode, each address shift register segment AR1-1 to AR1-3 receives address signals on 4-bit wide lines 926-1 to 926-3 provided from an external source (not shown). Likewise, address register segment AR2-3 receives address signals from an external source (not shown). Also in normal mode, the first data registers (DR1) provide access to the storage array, via lines 928-1 to 928-9, in response to address signals provided to the first address register segments AR1-1 to AR1-3.

Various modifications to the preferred embodiments can be made without departing from the spirit and scope of the invention. In one alternative embodiment (not shown), for example, a tapped shift register can be implemented using some individual registers that are part of one port of a RAM block and other individual registers that are taken from programmable logic elements. In other words, such alternative embodiment would include a tapped shift register formed partially of registers from the RAM block and partially from programmable logic element registers external to the RAM block. Thus, the foregoing description is not intended to limit the invention which is described in the appended claims.

What is claimed is:

1. A programmable logic device comprising:
   a multi-port RAM block which includes a first port including first address registers and first data registers and which includes a second port including second address registers and second data registers;
   at least one look-up table stored in the RAM block;
   first programmable logic circuitry programmed to operate as a shift register which includes multiple tap outputs coupled to multiple first address registers; and
   second programmable logic circuitry programmed to operate as accumulate circuitry which includes a multi-bit input coupled to multiple first data registers and includes an accumulator output.

2. The programmable logic device of claim 1 further including:
   address control circuitry that regulates simultaneous transfers of data through the first and second ports.

3. The programmable logic device of claim 1 and further including:
   address control circuitry that regulates access to the at least one look up tables by,
      providing read access to one storage location of the at least one look up table via the first address registers and the first data registers of the first port while concurrently providing write access to another storage location of the at least one look up table via the second address registers and the second data registers of the second port.

4. The programmable logic device of claim 1,
   wherein the at least one look up table includes a first look up table and a second look up table; and further including:
   address control circuitry that regulates access to the first and second look up tables by alternately,
      providing read access to the first table via the first address registers and the first data registers of the first port while concurrently providing write access to the second table via the second address registers and the second data registers of the second port, and
      providing read access to the second table via the first address registers and the first data registers of the first port while concurrently providing write access to the first table via the second address registers and the second data registers of the second port.

5. The programmable logic device of claim 1 wherein, the first programmable logic is programmed so that the shift register includes a plurality of individual registers coupled to serially shift data and so that the tap outputs are spaced apart by a prescribed number of intervening registers.

6. The programmable logic device of claim 1 wherein, multiple data samples are provided within the shift register; and the first programmable logic is programmed so that different tap outputs provide access to respective bits from different respective data samples within the shift register.

7. The programmable logic device of claim 1, wherein respective storage locations of the at least one look up table are encoded with respective values representing respective products of respective multiplications of respective address values that address the respective storage locations and at least one other factor value.

8. A programmable logic device comprising:
a multi-port RAM block which includes a first port including first address registers and first data register and which includes a second port including second address registers and second data registers;
at least one look-up table stored in the RAM block;
wherein respective storage locations of the at least one look up table are encoded with respective values representing respective products of respective multiplications of respective address values that address the respective storage locations and at least one other factor value;
first programmable logic circuitry programmed to operate as a shift register which includes multiple tap outputs coupled to the first address registers;
second programmable logic circuitry programmed to operate as multiply and accumulate circuitry which includes a multi-bit input coupled to the first data registers and includes an accumulator output; and
address control circuitry that regulates access to the at least one look up tables by,
providing read access to one storage location of the at least one look up table via the first address registers and the first data registers of the first port while concurrently providing write access to another storage location of the at least one look up table via the second address registers and the second data registers of the second port.

9. A programmable logic device comprising:
a multi-port RAM block which includes a first port including first address registers and first data registers and which includes a second port including second address registers and second data registers;
a first look up table stored in the RAM block;
a second look up table stored in the RAM block;
wherein respective storage locations of at least one or the other of the first look up table or the second look up table is encoded with respective values representing respective products of respective multiplications of respective address values that address the respective storage locations and at least one other factor value;
first programmable logic circuitry programmed to operate as a shift register which includes multiple tap outputs coupled to the first address register;

second programmable logic circuitry programmed to operate as multiply and accumulate circuitry which includes a multi-bit input coupled to the first data registers and includes an accumulator output; and
address control circuitry that regulates access to the first and second look up tables by alternately,
providing read access to the first table via the first address registers and the first data registers of the first port while concurrently providing write access to the second table via the second address registers and the second data registers of the second port, and
providing read access to the second table via the first address registers and the first data registers of the first port while concurrently providing write access to the first table via the second address registers and the second data registers of the second port.

10. A programmable logic device comprising:
a first multi-port RAM block which includes a first port including first address registers and first data registers and which includes a second port including second address registers and second data registers;
at least one look-up table stored in the first RAM block;
a second multi-port RAM block which includes a first port including first address registers and first data registers and which includes a second port including second address registers and a second data registers;
at least one look-up table stored in the second RAM block;
first programmable logic circuitry programmed to operate as a shift register which includes first multiple tap outputs coupled to multiple first address registers of the first port of the first RAM block and which includes second multiple tap outputs coupled to multiple first address registers of the first port of the second RAM block;
second programmable logic circuitry programmed to operate as accumulate circuitry which includes a multi-bit input coupled to multiple first data registers of the first port and to multiple first data registers of the second port.

11. The programmable logic device of claim 10 further including:
address control circuitry that regulates simultaneous transfers of data through the first and second ports of the first RAM block and that regulates simultaneous transfers of data through the first and second ports of the second RAM block.

12. The programmable logic device of claim 10 and further including:
address control circuitry that regulates access to the at least one look up table stored in the first RAM block by,
providing read access to one storage location of the at least one look up table stored in the first RAM block via the first address registers and the first data registers of the first port of the first RAM block while concurrently providing write access to another storage location of the at least one look up table via the second address registers and the second data registers of the second port of the first RAM block;
wherein the address control circuitry regulates access to the at least one look up table stored in the second RAM block by,
providing read access to one storage location of the at least one look up table stored in the second RAM block via the first address registers and the first data registers of the second port of the first RAM block while concurrently providing write access to another storage location of the at least one look up table via the second address registers and the second data registers of the second port of the second RAM block.

13. The programmable logic device of claim 10, wherein the at least one look up table stored in the first RAM block includes a first look up table and a second look up table in the first RAM block;

wherein the at least one look up table stored in the second RAM block includes a first look up table and a second look up table in the second RAM block; and further including:

address control circuitry that regulates access to the first and second look up tables of the first RAM blocks by alternately, providing read access to the first table of the first RAM block via the first address registers and the first data registers of the first port of the first RAM block while concurrently providing write access to the second table of the first RAM block via the second address registers and the second data registers of the second port of the first RAM block, and providing read access to the second table of the first RAM block via the first address registers and the first data registers of the first port of the first RAM block while concurrently providing write access to the first table via the second address registers and the second data registers of the second port of the first RAM block;

wherein the address control circuitry regulates access to the first and second look up tables of the second RAM blocks by alternately, providing read access to the first table of the second RAM block via the first address registers and the first data registers of the first port of the second RAM block while concurrently providing write access to the second table of the second RAM block via the second address registers and the second data registers of the second port of the second RAM block, and providing read access to the second table of the second RAM block via the first address registers and the first data registers of the first port of the second RAM block while concurrently providing write access to the first table via the second address registers and the second data registers of the second port of the second RAM block.

14. The programmable logic device of claim 10 wherein, respective storage locations of the first RAM block are encoded with respective values representing respective products of respective multiplications of respective address values that address respective storage locations of the first RAM block and at least one other factor value; and respective storage locations of the second RAM block are encoded with respective values representing respective products of respective multiplications of respective address values that address respective storage locations of the second RAM block and at least one other factor value.

15. A method using a programmable logic device including a multi-port RAM block which includes a first port including first address registers and first data registers and which includes a second port including second address registers and a second data registers; first programmable logic circuitry programmed to operate as a shift register which includes multiple tap outputs coupled to multiple first address registers; and second programmable logic circuitry programmed to operate as multiply and accumulate circuitry which includes a multi-bit input coupled to multiple first data registers and includes an accumulator output, the method comprising:

providing at least one look up table in the RAM block; and providing read access to one storage location of the at least one look up table via the first address registers and the first data registers of the first port while concurrently providing write access to another storage location of the at least one look up table via the second address registers and the second data registers of the second port.

16. The method of claim 15, further including:

encoding RAM block storage locations with respective pre-computed results values representing arithmetic operations involving respective addresses of the storage locations and at least one other respective value;

shifting n multiple multi-bit samples through a multiple tap shift register in which tap outputs are coupled to a multi-bit address input of the RAM block such that RAM block storage locations are addressed by a sequence of sets of sample bits shifted to the multiple tap outputs as the multi-bit samples are shifted through the shift register;

retrieving in order from the RAM block, a sequence of respective results values stored at storage locations addressed by the sets of multiple bits shifted to the multiple tap outputs; and producing an accumulation result for the n samples by adding together the retrieved results values.

17. The method of claim 16 wherein, producing an accumulation result for the n samples by adding together the retrieved results values includes:

adding the n sequentially retrieved results values using a scaling accumulation process in which a second retrieved results value is added to a scaled version of a first retrieved results value so as to produce an accumulation value and then adding each subsequently retrieved results value to a scaled version of the accumulation value so as to produce a new accumulation value.

18. The method of claim 16 wherein, producing an accumulation result for the n samples by adding together the sequentially retrieved results values includes:

adding the n sequentially retrieved product values using a scaling accumulation process in which a second retrieved results value is added to a first retrieved results value divided by two so as to produce an accumulation value and then adding each subsequently retrieved results value to the accumulation value divided by two so as to produce a new accumulation value.

19. A method using a programmable logic device including a multi-port RAM block which includes a first port including first address registers and first data registers and which includes a second port including second address registers and second data registers; first programmable logic circuitry programmed to operate as a shift register which includes multiple tap outputs coupled to the first address registers; and second programmable logic circuitry programmed to operate as multiply and accumulate circuitry which includes a multi-bit input coupled to the first data registers and includes an accumulator output, a method comprising:

provide a first look up table and a second look up table in the RAM block; and regulating access to the first and second look up tables by alternately, providing read access to the first table via the first address registers and the first data registers of the first port while concurrently providing write access to the second table via the second address registers and the second data registers of the second port, and providing read access to the second table via the first address registers and the first data registers of the first port while concurrently providing write access to the first table via the second address registers and the second data registers of the second port.

20. The method of claim 19, further including:

encoding RAM block storage locations with respective pre-computed results values representing arithmetic operations involving respective addresses of the storage locations and at least one other respective value;

shifting n multiple multi-bit samples through a multiple tap shift register in which tap outputs are coupled to a multi-bit address input of the RAM block such that RAM block storage locations are addressed by a sequence of sets of sample bits shifted to the multiple tap outputs as the multi-bit samples are shifted through the shift register;

retrieving in order from the RAM block, a sequence of respective results values stored at storage locations addressed by the sets of multiple bits shifted to the multiple tap outputs; and producing an accumulation result for the n samples by adding together the retrieved results values.

21. The method of claim 20 wherein, producing an accumulation result for the n samples by adding together the retrieved results values includes:

adding the n sequentially retrieved results values using a scaling accumulation process in which a second retrieved results value is added to a scaled version of a first retrieved results value so as to produce an accumulation value and then adding each subsequently retrieved results value to a scaled version of the accumulation value so as to produce a new accumulation value.

22. The method of claim 20 wherein, producing an accumulation result for the n samples by adding together the sequentially retrieved results values includes:

adding the n sequentially retrieved product values using a scaling accumulation process in which a second retrieved results value is added to a first retrieved results value divided by two so as to produce an accumulation value and then adding each subsequently retrieved results value to the accumulation value divided by two so as to produce a new accumulation value.

23. A programmable logic device comprising:

a multi-port RAM block which includes a first port including first address registers and first data registers and which includes a second port including second address registers and second data registers;

wherein multiple registers of the first port are coupled to operate as a shift register which includes multiple tap outputs;

wherein the multiple tap outputs are coupled to second multiple address registers of the second port;

programmable logic circuitry programmed to operate as accumulate circuitry which includes a multi-bit input coupled to the second data registers and includes an accumulator output.

24. The programmable logic device of claim 23, wherein the multiple registers of the first port that are coupled to operate as a shift register include at least one first address register.

25. The programmable logic device of claim 23, wherein the multiple registers of the first port that are coupled to operate as a shift register include at least one first data register.

26. The programmable logic device of claim 23, wherein the multiple registers of the first port that are coupled to operate as a shift register include at least one first address register and at least one first data register.

27. The programmable logic device of claim 23, wherein respective storage locations of the RAM block are encoded with respective values representing respective products of respective multiplication's of respective address values that address the respective storage locations and at least one other factor value.

* * * * *